United States Patent

Riley

Patent Number: 5,533,754
Date of Patent: Jul. 9, 1996

[54] AIR BAG INFLATOR

[75] Inventor: Michael C. Riley, Gilbert, Ariz.

[73] Assignee: TRW Vehicle Safety Systems Inc., Lyndhurst, Ohio

[21] Appl. No.: 456,028

[22] Filed: May 31, 1995

[51] Int. Cl.⁶ ............................................. B60R 21/28
[52] U.S. Cl. ............................................. 280/741
[58] Field of Search ....................... 280/741, 736, 280/740, 742

[56] References Cited

U.S. PATENT DOCUMENTS

| | | | |
|---|---|---|---|
| 4,200,615 | 4/1980 | Hamilton | 280/741 |
| 4,817,828 | 4/1989 | Goetz | 222/3 |
| 4,890,860 | 1/1990 | Schneiter | 280/741 |
| 5,104,466 | 4/1992 | Allard et al. | 149/21 |
| 5,109,772 | 5/1992 | Cunningham et al. | 280/741 |
| 5,131,679 | 7/1992 | Novak et al. | 280/736 |
| 5,140,906 | 8/1992 | Little, II | 102/202.14 |
| 5,241,910 | 9/1993 | Cunningham et al. | 102/530 |
| 5,345,875 | 9/1994 | Anderson | 102/530 |
| 5,356,176 | 10/1994 | Wells | 280/737 |
| 5,380,039 | 1/1995 | Emery et al. | 280/741 |

*Primary Examiner*—Kenneth R. Rice
*Attorney, Agent, or Firm*—Tarolli, Sundheim, Covell, Tummino & Szabo

[57] ABSTRACT

An inflator (14) for inflating an air bag (12) includes a housing (50) containing ignitable gas generating material (60), and an initiator (240) for igniting the gas generating material (60). The inflator (14) further includes a closure cap (56) for closing an end portion (352) of the housing (50), and a retainer (242) for supporting the initiator (240) on the closure cap (56). The closure cap (56) and the retainer (242) have metal surface portions (220,286,290) which extend circumferentially around an axis (40,172) and which are pressed radially against each other to form a seal (332) for blocking gas from exiting the housing (50) between the retainer (242) and the closure cap (56). The metal surface portions (286,290) of the retainer (242) include a cylindrical surface (286) and a frusto-conical surface (290). The frusto-conical surface (290) extends radially inward from the cylindrical surface (286) and is inclined at an angle (A1) from a plane (292) perpendicular to the axis (40). The angle (A1) is within the range of approximately 20° to approximately 40°.

9 Claims, 9 Drawing Sheets

AIR BAG INFLATOR

FIELD OF THE INVENTION

The present invention relates to an apparatus for inflating an inflatable vehicle occupant restraint, such as an air bag.

BACKGROUND OF THE INVENTION

U.S. Pat. No. 4,817,828 discloses an apparatus for inflating an inflatable vehicle occupant restraint such as an air bag. The apparatus includes an inflator which comprises a source of gas for inflating the air bag. A body of ignitable gas generating material is contained in the inflator. The gas generating material is ignited when the vehicle experiences a condition that indicates the occurrence of a collision for which inflation of the air bag is desired. The collision-indicating condition may comprise, for example, the occurrence of a predetermined amount of vehicle deceleration. As the gas generating material burns, it generates a large volume of gas which is directed to flow from the inflator into the air bag to inflate the air bag. When the air bag is inflated, it extends into the vehicle occupant compartment to restrain an occupant of the vehicle from forcefully striking parts of the vehicle.

The inflator disclosed in the '828 patent has a cylindrical housing with a combustion chamber in which the body of gas generating material is contained. The housing has a tubular outer wall which is closed at its axially opposite ends by a pair of circular end walls. The end walls extend diametrically across the open ends of the tubular wall. Each end wall has an annular peripheral flange, and is held in place by a respective end portion of the tubular wall which is crimped around the flange. The closed ends of the housing are sealed by a pair of elastomeric sealing rings. Each of the sealing rings is located inside the housing adjacent to a respective one of the end walls.

The inflator disclosed in the '828 patent further includes an igniter assembly which is actuated in response to the collision-indicating condition. When the igniter assembly is actuated, a pyrotechnic material in the igniter assembly is ignited and emits combustion products which, in turn, ignite the gas generating material. The pyrotechnic material is contained in a relatively narrow cylindrical igniter housing. The igniter housing is screwed through a threaded opening at the center of one of the circular end walls, and is thus supported on the axis of the inflator at one end of the combustion chamber.

SUMMARY OF THE INVENTION

In accordance with the present invention, an apparatus for inflating an inflatable vehicle occupant restraint, such as an air bag, comprises a housing and an actuatable initiator. The housing contains a source of fluid. The initiator comprises means for initiating a flow of fluid from the housing when the initiator is actuated. The apparatus further comprises a closure cap and a retainer. The closure cap comprises means for closing an end portion of the housing, and has inner surface portions formed of a metal material. The retainer comprises means for supporting the initiator on the closure cap. The retainer has outer surface portions formed of a metal material.

The inner surface portions of the closure cap and the outer surface portions of the retainer extend circumferentially around an axis. Moreover, the inner and outer surface portions are pressed radially against each other. The inner and outer surface portions thus comprise sealing means for blocking the fluid from exiting the housing between the retainer and the closure cap.

The outer surface portions of the retainer include a cylindrical surface and a frusto-conical surface. The frusto-conical surface extends radially inward from the cylindrical surface, and is inclined at an angle from a plane perpendicular to the axis. The angle is within the range of approximately 20° to approximately 40°.

In a preferred embodiment of the present invention, the retainer has a circumferentially extending rim at the juncture of the cylindrical surface and the frusto-conical surface. The inner surface portions of the closure cap are pressed radially inward against the rim so as to define a narrow annular seal extending circumferentially around the rim. The seal thus comprises an inner surface portion of the closure cap which adjoins the frusto-conical surface of the retainer at the rim of the retainer. In this configuration, the width of the seal is determined in part by the angle of inclination of the frusto-conical surface. By maintaining that angle within the range of approximately 20° to approximately 40° the width of the seal, and hence the effectiveness of the seal, is optimized.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
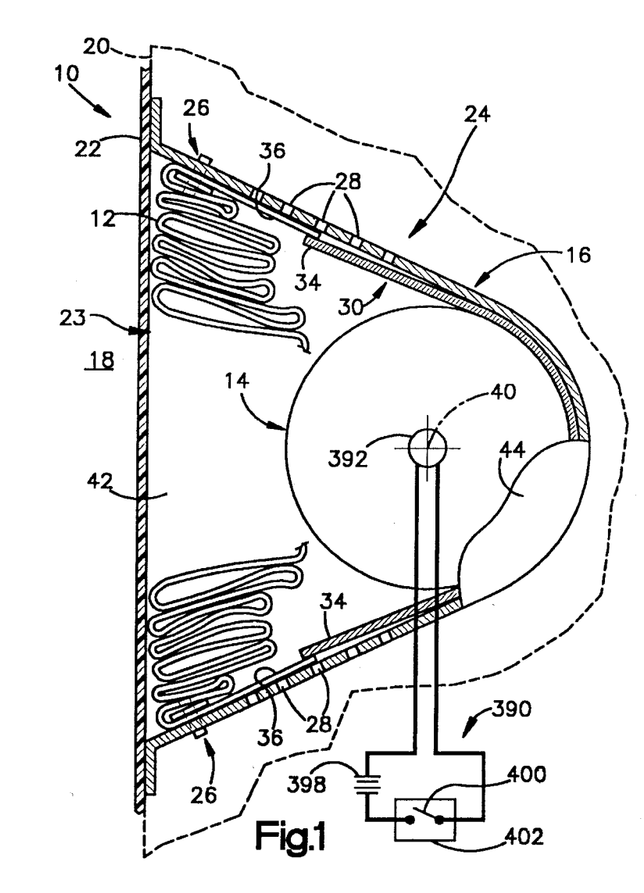
FIG. 1 is a schematic view of a vehicle occupant restraint apparatus including an inflator comprising a preferred embodiment of the present invention.
Figure 2:
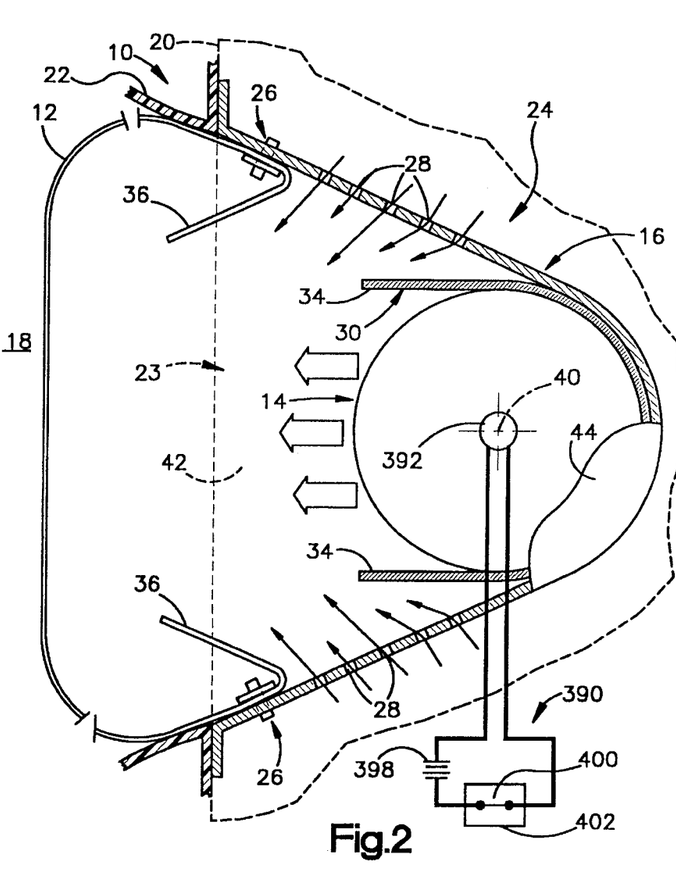
FIG. 2 is a schematic view showing the apparatus of FIG. 1 in an actuated condition.

A vehicle occupant restraint apparatus 10 comprising a preferred embodiment of the present invention is shown schematically in FIGS. 1 and 2. The apparatus 10 includes an inflatable vehicle occupant restraint 12 which, as shown, is a particular occupant restraint commonly referred to as an air bag. The apparatus 10 further includes an inflator 14 which comprises a source of inflation fluid for inflating the air bag 12.

The air bag 12 and the inflator 14 are housed in a reaction canister 16. The reaction canister 16 is mounted in a part of a vehicle that adjoins the vehicle occupant compartment 18, such as the instrument panel 20 of the vehicle. A deployment door 22 extends over a deployment opening 23 in the reaction canister 16. The deployment door 22 continues the trim theme of the instrument panel 20 across the deployment opening 23, and thus conceals the air bag 12 and the reaction canister 16 from the vehicle occupant compartment 18. The air bag 12, the inflator 14, the reaction canister 16 and the deployment door 22 are parts of an air bag module 24 which is assembled separately from the instrument panel 20.

When the vehicle experiences a collision for which inflation of the air bag 12 is desired to restrain an occupant of the vehicle, the inflator 14 is actuated. The inflator 14 then emits a large volume of inflation fluid which flows into the air bag 12 to inflate the air bag 12 from a stored, folded condition (FIG. 1) to an inflated condition (FIG. 2). As the inflation fluid begins to inflate the air bag 12, it moves the air bag 12 outwardly against the deployment door 22. A stress riser (not shown) in the deployment door 22 ruptures under the stress induced by the increasing pressure of the inflation fluid flowing into the air bag 12 from the inflator 14. As the inflation fluid continues to inflate the air bag 12, it moves the air bag 12 outward through the deployment opening 23 past the deployment door 22, as shown in FIG. 2. The air bag 12 then extends into the vehicle occupant compartment 18 to restrain an occupant of the vehicle from forcefully striking the instrument panel 20 or other parts of the vehicle.

The air bag 12 is connected to the reaction canister 16 by suitable clamping assemblies 26. A plurality of ambient air flow openings 28 extend through the reaction canister 16 between the inflator 14 and the air bag 12. A sheet 30 of foil or the like provides a pair of flaps 34 extending from the inflator 14 over several of the ambient air flow openings 28. Additional flaps 36, which preferably comprise edge portions of the air bag 12, extend from the clamping assemblies 26 over the remainder of the ambient air flow openings 28.

As shown schematically in FIGS. 1 and 2, the inflator 14 has a cylindrical shape with a longitudinal central axis 40, and extends axially between two opposite side walls 42 and 44 of the reaction canister 16. As shown in greater detail in FIG. 3, the inflator 14 has a cylindrical housing 50. The housing 50 has a tubular outer wall 52 and a circular end wall 54, each of which is centered on the axis 40. The end wall 54 closes one end of the housing 50, and supports a threaded mounting stud 58 for mounting the inflator 14 in the reaction canister 16. A circular closure cap 56 closes the other end of the housing 50. The closure cap 56 also is centered on the axis 40.

Figure 3:
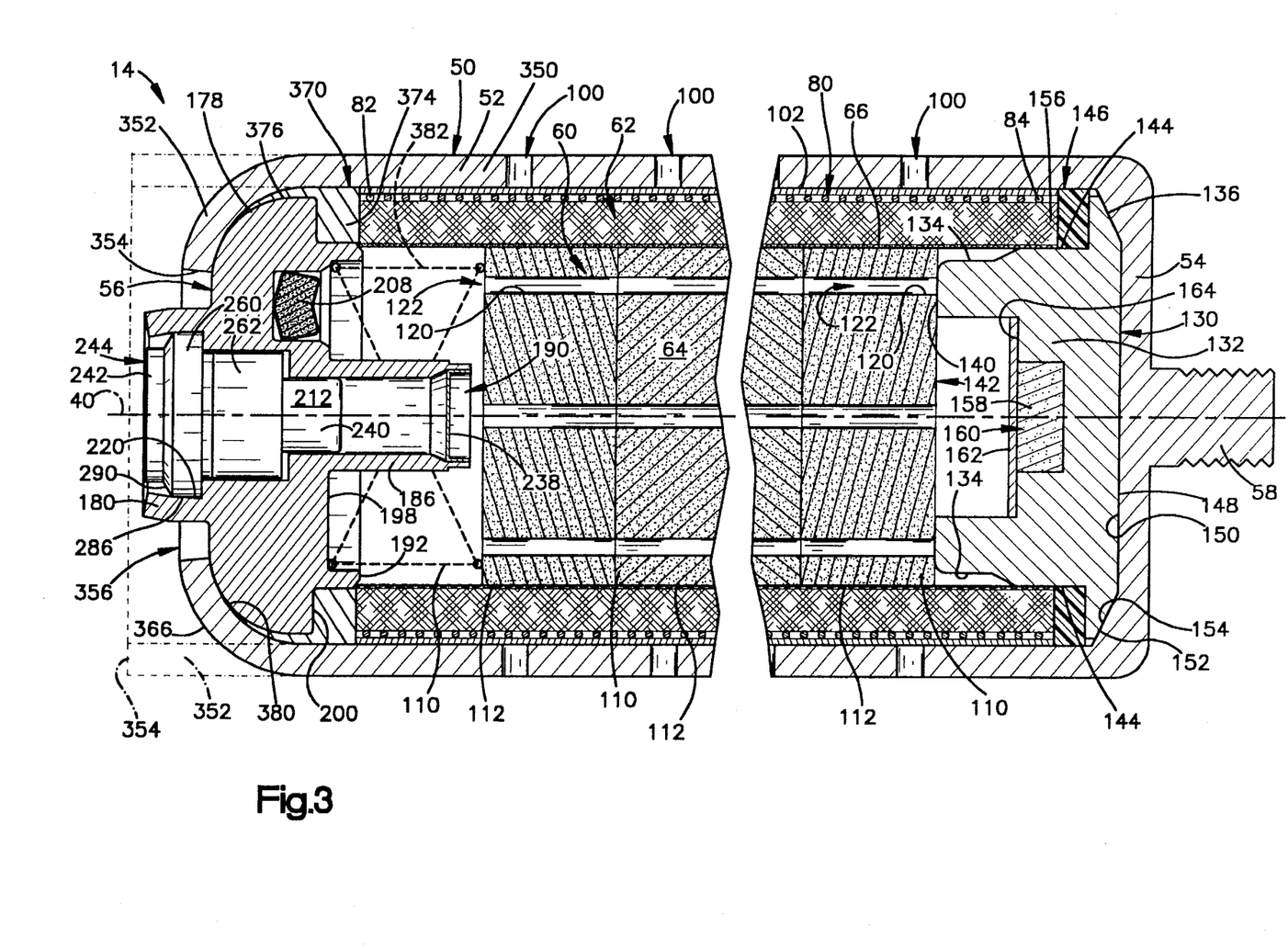
FIG. 3 is a sectional view of the inflator of FIG. 1.

In the preferred embodiment of the present invention shown in the drawings, the inflation fluid comprises gas which is generated upon combustion of an elongated cylindrical body 60 of ignitable gas generating material. The housing 50 contains the body 60 of gas generating material, and also contains a tubular structure 62. The tubular structure 62 defines a cylindrical combustion chamber 64 in which the body 60 of gas generating material is located.

Figure 4:
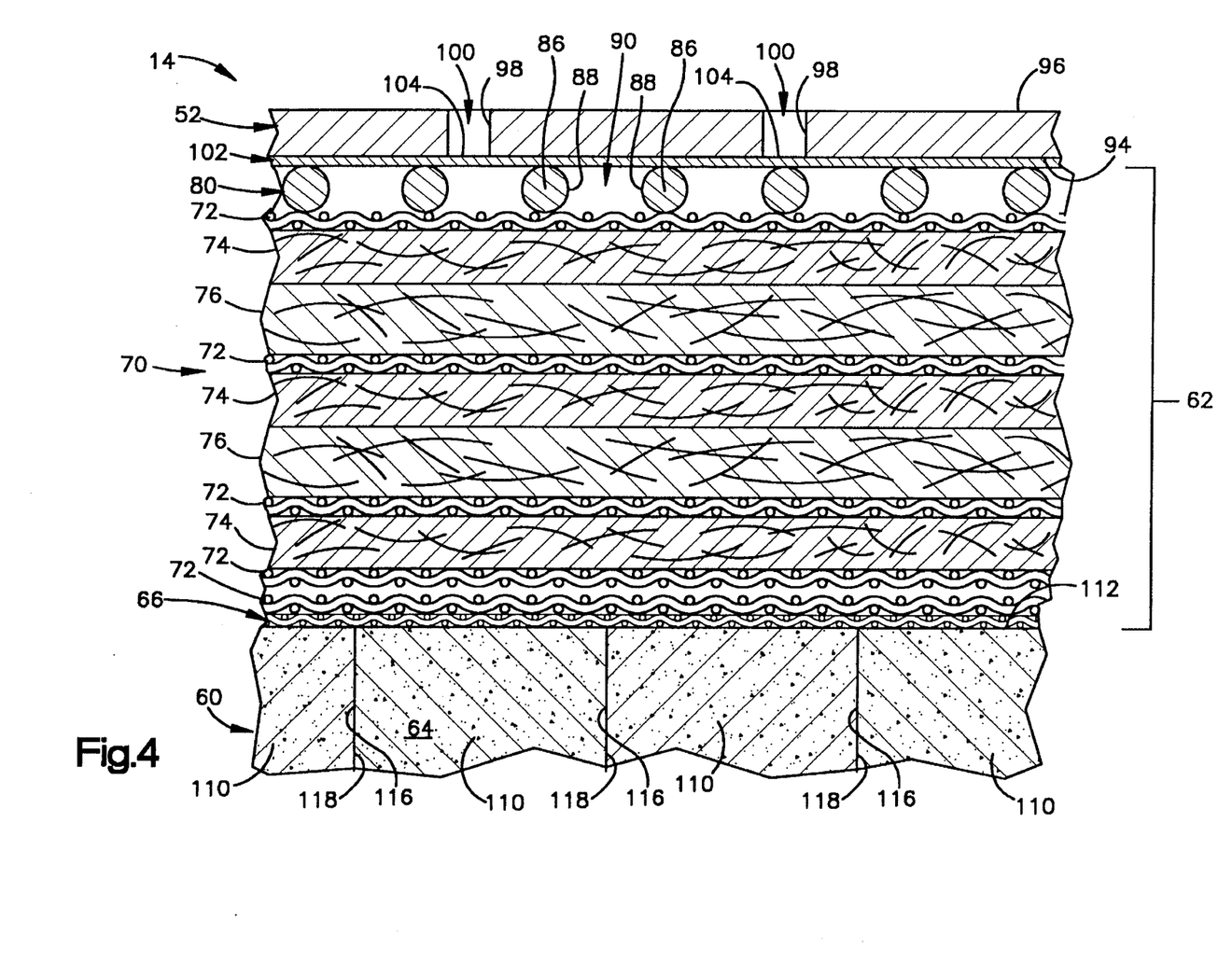
FIG. 4 is an enlarged sectional view of parts shown in FIG. 3.

As shown in enlarged detail in FIG. 4, the combustion chamber 64 is defined by a cylindrical wire mesh screen 66 which defines the inner diameter of the tubular structure 62. Alternatively, the combustion chamber 64 could be defined by a perforated tubular inner body wall. Such an inner body wall could be constructed as known in the art.

A generally cylindrical filter 70 extends circumferentially around the screen 66. The filter 70 preferably has a plurality of generally cylindrical filter layers, including layers 72 of wire mesh screen, layers 74 of steel wool, and layers 76 of ceramic/glass wool, as shown in FIG. 4. The filter 70 also could have an alternative structure as known in the art.

The tubular structure 62 further includes a support member 80. The support member 80 is a strand of metal wire which extends circumferentially and axially over the filter 70. More specifically, the support member 80 has opposite ends 82 and 84 (FIG. 3), which are fixed to the filter 70 by welds (not shown), and extends over the filter 70 in a helical configuration. The support member 80 thus has a plurality of successive sections 86 (FIG. 4) which are shaped as helical turns extending over the filter 70 circumferentially entirely around the axis 40. The helical sections 86 of the support member 80 have opposed helical surface portions 88 which are spaced from each other axially to define a gap 90. The gap 90 likewise extends over the filter 70 circumferentially entirely around the axis 40 in a plurality of helical turns. The gap 90 is open and free of obstructions axially across its width and circumferentially along its entire length. The width of the gap 90 can be varied, and is preferred to be substantially greater than the widths of the openings in the underlying layers 72 of wire mesh screen in the filter 70.

The tubular outer wall 52 of the housing 50 has a cylindrical inner side surface 94, a cylindrical outer side surface 96, and a plurality of cylindrical inner edge surfaces 98 which define gas outlet openings 100 extending radially through the outer wall 52. A sheet 102 of rupturable pressure controlling material, which is preferably formed of aluminum foil, extends circumferentially around the inner side surface 94 of the outer wall 52 in continuous contact with the inner side surface 94. The sheet 102 thus has a plurality of individual circular portions 104, each of which extends across the inner end of a respective one of the gas outlet openings 100 in the outer wall 52.

The sheet 102 of rupturable pressure controlling material is preferably adhered to the inner side surface 94 of the outer wall 52 of the housing 50 before the tubular structure 62 is installed in the housing 50. The tubular structure 62, which includes the filter 70, is then moved longitudinally into the housing 50 through the open end of the tubular outer wall 52. When the tubular structure 62 is thus moved into the housing 50, the support member 80 slides against the sheet 102 of rupturable pressure controlling material in helical line contact. The line contact helps prevent the outermost layer 72 of wire mesh screen in the filter 70 from tearing the sheet 102 of rupturable pressure controlling material.

The elongated body 60 of gas generating material is defined by a plurality of separate, coaxial cylindrical bodies 110 of gas generating material which are known as grains. The gas generating material of which the grains 110 are formed is an ignitable material which rapidly generates a large volume of gas when ignited. The gas generating material may have any suitable composition known in the art, and the grains 110 may have any suitable configuration known in the art.

Figure 5:
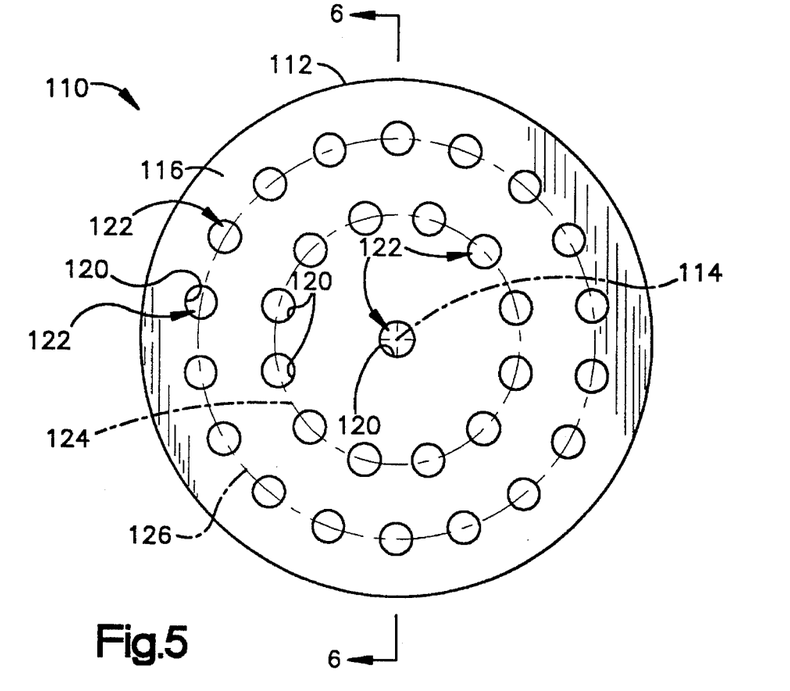
FIG. 5 is an enlarged view of a part shown in FIG. 3.
Figure 6:
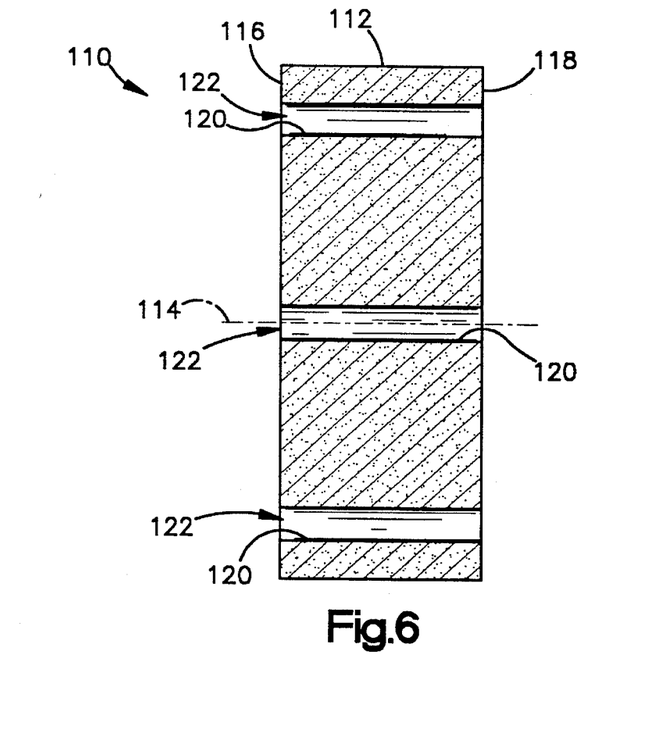
FIG. 6 is a view taken on line 6—6 of FIG. 5.

As an example of the different grains of gas generating material that may be used in the inflator 14, the configuration of one such grain 110 is shown in detail in FIGS. 5 and 6. The grain 110 has a cylindrical outer surface 112 centered on an axis 114. The grain 110 further has first and second opposite side surfaces 116 and 118. Each of the opposite side surfaces 116 and 118 has a circular shape centered on the axis 114, and is generally perpendicular to the axis 114.

The grain 110 preferably has a plurality of cylindrical inner surfaces 120, each of which defines a respective cylindrical passage 122 extending axially through the grain 110. The number and arrangement of the cylindrical inner surfaces 120 may vary. As shown by way of example in FIGS. 5 and 6, one of the cylindrical inner surfaces 120 is centered on the axis 114, and the other cylindrical inner surfaces 120 are arranged in first and second circular arrays. The first circular array of the cylindrical inner surfaces 120 extends circumferentially around the axis 114 on a first circular line 124. The first circular line 124 is centered on the axis 114. The second circular array of the cylindrical inner surfaces 120 extends circumferentially around the axis 114 on a second circular line 126. The second circular line 126 also is centered on the axis 114, and is spaced radially outward from the first circular line 124. Moreover, each of the cylindrical inner surfaces 120 in the second circular array is at least partially offset circumferentially from each of the cylindrical inner surfaces 120 in the first circular array.

Each of the grains 110 of gas generating material preferably has an ignition-enhancing coating formed of a pyrotechnic material. The pyrotechnic material of which the coatings are formed does not generate a significant amount of gas for inflating the air bag 12, but is more readily ignitable than the gas generating material of which the grains 110 are formed. The pyrotechnic material may have any suitable composition known in the art. Alternatively, the grains 110 of gas generating material could be free of such coatings.

A circular spacer 130 is contained in the housing 50 at the end of the housing 50 opposite the closure cap 56. The spacer 130 has a cylindrical body 132 centered on the axis 40. The body 132 has a cylindrical outer surface 134 with a diameter that is less than the inner diameter of the tubular structure 62. A flange 136 projects radially outward from the rear end of the body 132. An annular front side surface 140 of the spacer 130 is located on the front end of the body 132 opposite the flange 136. The front side surface 140 defines a circular opening 142 centered on the axis 40.

The spacer 140 further has a plurality of lobes 144, two of which are shown in the sectional view of FIG. 3. The lobes 144 project radially outward from the cylindrical outer surface 134 of the body 132, and are elongated in directions extending axially over the body 132. The lobes 144 are evenly spaced from each other circumferentially about the axis 40, and all have the same size and shape.

An annular elastomeric seal 146 is stretched circumferentially and radially over the lobes 144 on the spacer 130, and is received in the housing 50 concentrically with the spacer 130. A planar rear surface portion 148 of the spacer 130 abuts a substantially coextensive planar inner surface portion 150 of the end wall 54. A frusto-conical rear surface portion 152 of the spacer 130 abuts a frusto-conical inner surface portion 154 of the end wall 54. The spacer 130 is thus seated closely against the end wall 54 in a position centered on the axis 40.

As described briefly above, the tubular structure 62, including the filter 70, is moved longitudinally into the housing 50 through the open end of the outer wall 52 along the axis 40 toward the end wall 54. As the tubular structure 62 approaches the end wall 54, an inner end portion 156 of the tubular structure 62 moves against the seal 146. The tubular structure 62 is then pressed forcefully into the housing 50 and against the seal 146. The process of pressing the tubular structure 62 forcefully into the housing 50 is described fully below with reference to the closure cap 56 at the opposite end of the housing 50. When the inner end portion 156 of the tubular structure 62 is pressed forcefully against the seal 146, the seal 146 is loaded compressively between the surrounding surfaces of the adjoining parts of the inflator 14. As a result, the seal 146 fills the space through which a flow of gas from the combustion chamber 64 might otherwise leak past the filter 70 by flowing around the inner end portion 156 of the tubular structure 62.

A body 158 of auto-ignition material is preferably provided in a compartment 160 at the center of the spacer 130. The body 158 of auto-ignition material is held in the compartment 160 by a piece 162 of metal foil or the like which is adhered to an annular surface 164 surrounding the compartment 160. The auto-ignition material ignites and emits combustion products automatically at a predetermined elevated temperature, and may have any suitable composition known in the art. The combustion products emitted from the body 158 of auto-ignition material rupture the foil 162 and emerge from the front end of the spacer 130 through the opening 142. Those combustion products thus move against the adjacent grain 110 of gas generating material in the combustion chamber 64 to ignite the elongated body 60 of gas generating material automatically when the ambient temperature of the inflator 14 reaches the predetermined elevated level.

Although the preferred embodiment of the present invention includes the spacer 130 and the seal 146, the closed end of the housing 50 could be sealed by an alternative structure.

Figure 7:
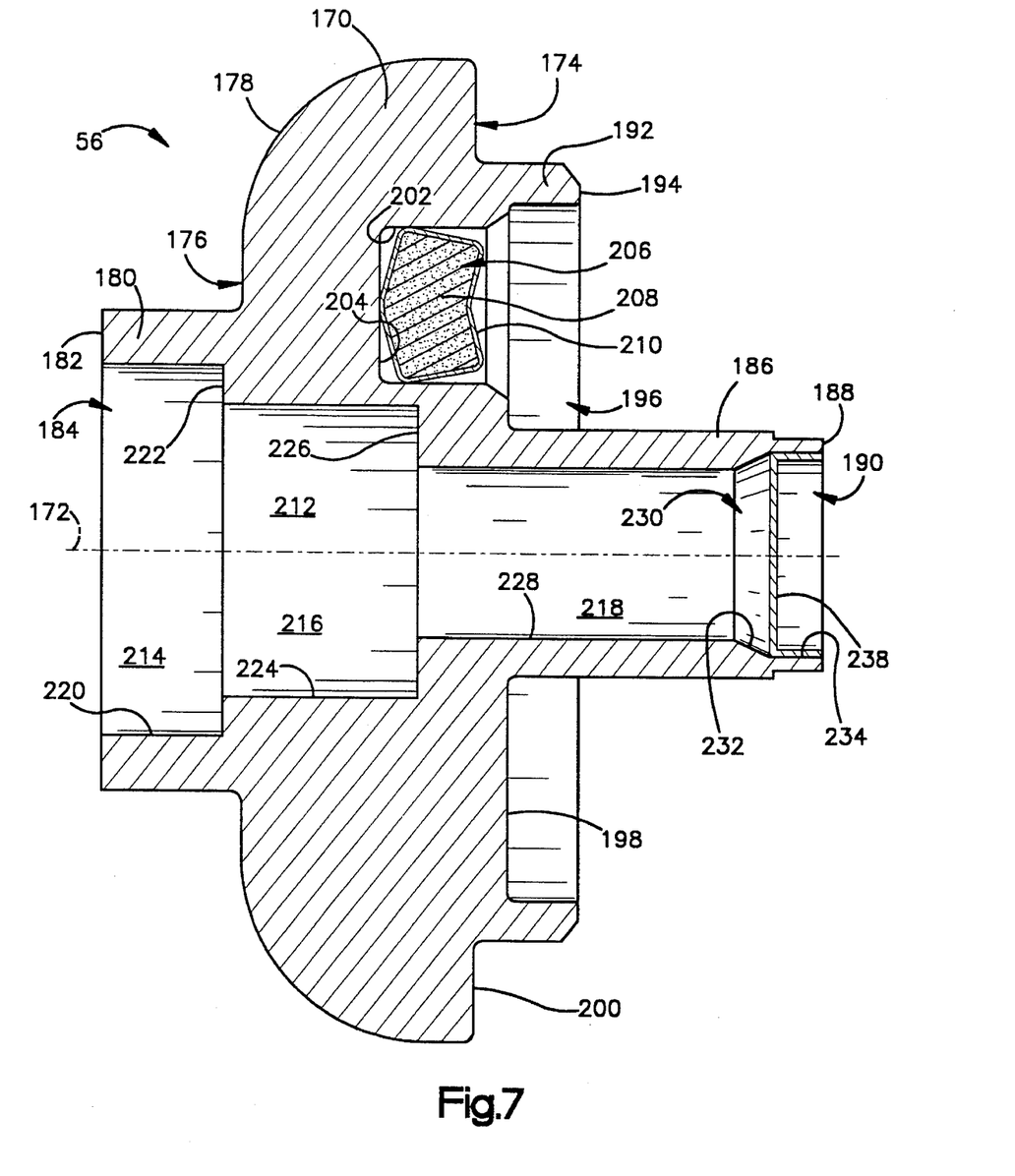
FIG. 7 is an enlarged view of parts shown in FIG. 3.

As best shown in FIG. 7, the closure cap 56 has a body portion 170 centered on an axis 172. The body portion 170 of the closure cap 56 has axially inner and outer sides 174 and 176. A circumferentially extending peripheral surface 178 of the body portion 170 has an arcuate cross-sectional profile extending axially outward, and radially inward, from the inner side 174 to the outer side 176. The peripheral surface 178 thus has the contour of a dome which is centered on the axis 172.

A first wall portion 180 of the closure cap 56 projects from the outer side 176 of the body portion 170. The first wall portion 180 has a cylindrical shape centered on the axis 172. An annular outer end surface 182 of the first wall portion 180 defines a circular opening 184 centered on the axis 172. A second wall portion 186 of the closure cap 56 projects from the inner side 174 of the body portion 170. The second wall portion 186 also has a cylindrical shape centered on the axis 172. However, the cylindrical shape of the second wall portion 186 is substantially longer and narrower than the cylindrical shape of the first wall portion 180. An annular inner end surface 188 of the second wall portion 186 defines a circular opening 190 centered on the axis 172.

A third wall portion 192, which is substantially shorter than the second wall portion 186, also projects from the inner side 174 of the body portion 170. The third wall portion 192 has an annular shape centered on the axis 172, and is spaced radially outward from the second wall portion 186. An annular inner end surface 194 of the third wall portion 192 defines a circular opening 196 through which the second wall portion 186 extends along the axis 172.

The inner side 174 of the closure cap 56 includes first and second planar inner side surfaces 198 and 200, each of which lies in a respective plane perpendicular to the axis 172. The first inner side surface 198 has an annular shape centered on the axis 172, and is located radially between the second and third wall portions 186 and 192. The second inner side surface 200 also has an annular shape centered on the axis 172, and is located radially outward of the third wall portion 192.

In the preferred embodiment of the present invention shown in the drawings, the closure cap 56 has additional inner side surfaces 202 and 204 which together define a generally cylindrical compartment 206. The compartment 206 contains a body 208 of auto-ignition material. Like the body 158 of auto-ignition material described above, the body 208 may be formed of any suitable auto-ignition material which ignites and emits combustion products automatically at a predetermined elevated temperature. The body 208 of auto-ignition material is encapsulated in, and is hermetically sealed by, a rupturable piece 210 of metal foil or the like. The body 208 and the encapsulating foil 210 are retained in the compartment 206 by an interference fit with the surrounding inner surface 202 of the closure cap 56.

A passage 212 extends through the closure cap 56 between the openings 184 and 190. The passage 212 has three successive sections 214, 216, and 218, each of which has a cylindrical shape centered on the axis 172. The first section 214 of the passage 212 extends axially from the opening 184 to the second section 216. The length and diameter of the first section 214 are defined by a first cylindrical inner surface 220 of the closure cap 56. An inner end of the first section 212 is defined by a first annular inner surface 222 which extends radially inward from the first cylindrical inner surface 220.

The second section 216 of the passage 212 extends axially from the first section 214 to the third section 218. A second cylindrical inner surface 224 defines a greater length, and a lesser diameter, for the second section 216, as compared to the first section 214. A second annular inner surface 226 extends radially inward from the second cylindrical inner surface 224. The second annular inner surface 226 thus defines the inner end of the second section 216. The third section 218 of the passage 212 extends axially from the second section 216. A third cylindrical inner surface 228 provides the third section 218 with the greatest length, and the smallest diameter, of the three sections 214, 216, and 218.

The passage 212 in the closure cap 56 further has a fourth section 230 extending axially from the third section 218 to the opening 190. The fourth section 230 is defined in part by a frusto-conical inner surface 232 and in part by a fourth cylindrical inner surface 234. The frusto-conical inner surface 232 extends axially inward, and radially outward, from the third cylindrical inner surface 228. The fourth cylindrical inner surface 234 extends axially from the frusto-conical inner surface 232 to the annular inner end surface 188 of the second wall portion 186 of the closure cap 56.

A cup-shaped closure member 238 is received closely within, and extends diametrically across, the fourth section 230 of the passage 212, as best shown in FIG. 7. The closure member 238 is preferably formed of aluminum, and is fixed to the fourth cylindrical inner surface 234 and/or to the annular inner end surface 188 by a laser weld (not shown). The closure member 238 and the weld together provide a hermetic seal between the opening 190 and the third section 218 of the passage 212.

Figure 8:
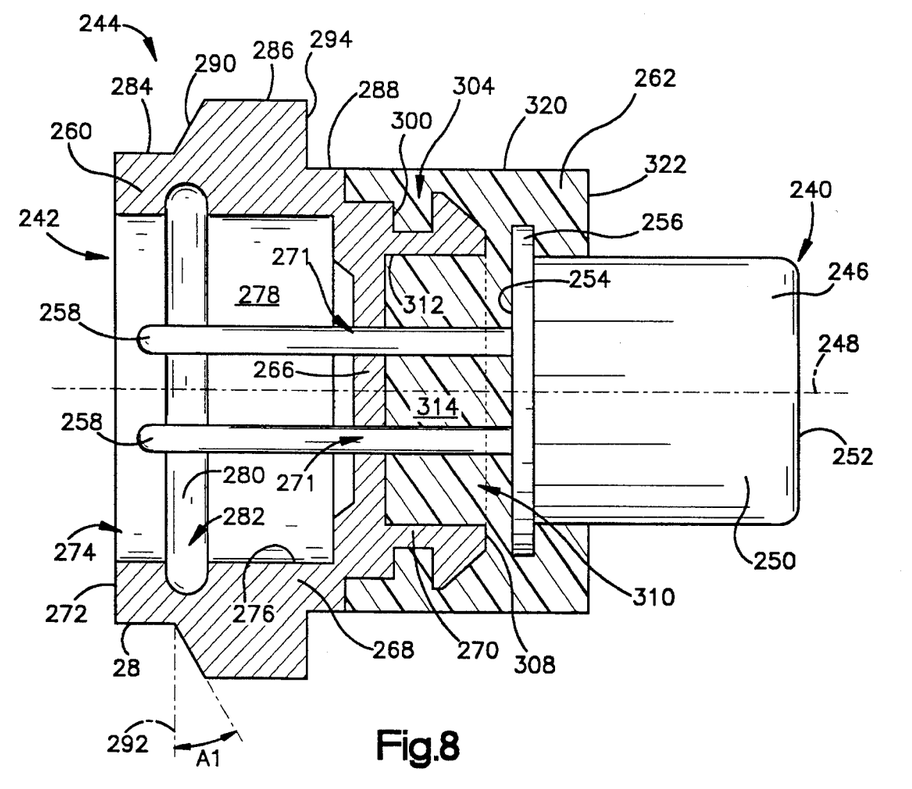
FIG. 8 is an enlarged view of other parts shown in FIG. 3.

As shown in FIG. 3, the inflator 14 further includes an initiator 240 at the center of the closure cap 56. The initiator 240 is supported at the center of the closure cap 56 by a retainer 242. As best shown in FIG. 8, the initiator 240 and the retainer 242 together comprise an initiator unit 244. The initiator unit 244 is assembled separately from the closure cap 56 before being installed in the closure cap 56.

The initiator 240 has a cylindrical metal casing 246 centered on an axis 248. The casing 246 has a cylindrical body wall 250, a circular front end wall 252, and a circular rear end wall 254. The body wall 250 has a diameter which is slightly less than the diameter of the third cylindrical inner surface 228 (FIG. 7) of the closure cap 56. An annular flange 256 projects radially outward from the body wall 250 at the rear end of the casing 246. A pair of electrical contact pins 258 extend axially outward from the casing 246 through the rear end wall 254. The contact pins 258 are connected to each other within the casing 246, such as by an electrical resistance element (not shown), in a known manner.

The casing 246 contains a charge of pyrotechnic material which is ignited upon the passage of electric current through the initiator 240 between the contact pins 258. When the pyrotechnic material is ignited, it produces combustion products which rupture and emerge from the casing 246. The pyrotechnic material may have any suitable composition known in the art.

With further reference to FIG. 8, the retainer 242 includes first and second retainer members 260 and 262. The first retainer member 260 is formed of a metal material, such as an aluminum alloy, and has a shape that is symmetrical about the axis 248. The second retainer member 262 is formed of a non-metal material, such as plastic, and also has a shape that is symmetrical about the axis 248. The second retainer member 262 is tightly interlocked with both the initiator 240 and the first retainer member 260 so as to secure the initiator 240 to the first retainer member 260. When the initiator unit 244 is installed in the closure cap 56, as shown in FIG. 3, the first retainer member 260 is tightly interlocked with the closure cap 56.

As shown in enlarged detail in FIG. 8, the first retainer member 260 has several distinct portions, including a circular wall portion 266, a first end portion 268, and a second end portion 270. The wall portion 266 extends diametrically across the axis 248. The contact pins 258 on the initiator 240 are received closely through a pair of apertures 271 in the wall portion 266. The first end portion 268 projects axially from one side of the wall portion 266. The second end portion 270 projects axially from the opposite side of the wall portion 266.

The first end portion 268 of the first retainer member 260 has an annular end surface 272. The end surface 272 defines a circular opening 274 centered on the axis 248. A cylindrical inner surface 276 extends axially from the end surface 272 to the wall portion 266. The cylindrical inner surface 276 defines the diameter of a cylindrical socket compartment 278 which extends axially from the opening 274 to the wall portion 266. A narrow recessed section 280 of the cylindrical inner surface 276 defines a groove 282 which extends circumferentially around the socket compartment 278.

The first end portion 268 of the first retainer member 260 further has a plurality of outer surfaces extending circumferentially around the axis 248. These include first, second, and third cylindrical outer surfaces 284, 286, and 288. The first cylindrical outer surface 284 extends axially from the annular end surface 272 toward the second cylindrical outer surface 286. The second cylindrical outer surface 286 is spaced radially outward from the first cylindrical outer surface 284 by a frusto-conical outer surface 290. The diameter of the second cylindrical outer surface 286 is equal to, or just slightly less than, the diameter of the first cylindrical inner surface 220 (FIG. 7) of the closure cap 56. Importantly, the frusto-conical outer surface 290 is inclined at an acute angle A1 from a plane 292 which is perpendicular to the axis 248. The angle A1 is within the range of approximately 20° to approximately 40° and is most preferably equal to 30°. The third cylindrical outer surface 288 is spaced radially inward from the second cylindrical outer surface 286 by a radially extending annular outer surface 294. The third cylindrical outer surface 288 extends away from the annular outer surface 294 and the second cylindrical outer surface 286 toward the wall portion 266.

As noted above, the second end portion 270 of the first retainer member 260 projects from the wall portion 266 oppositely from the first end portion 268. The second end portion 270 is also spaced radially inward from the first end portion 268. A recessed outer surface 300 of the second end portion 270 has a U-shaped radial profile, and thus defines a rectangular groove 304 extending circumferentially around the axis 248 adjacent to the wall portion 266. An annular end surface 308 defines a circular opening 310 which is centered on the axis 248. A cylindrical inner surface 312 extends axially from the end surface 308 to the wall portion 266. The cylindrical inner surface 312 defines the diameter of a cylindrical compartment 314 which extends axially from the opening 310 to the wall portion 266.

The second retainer member 262 has a cylindrical outer surface 320 and an annular outer surface 322. The cylindrical outer surface 320 is flush with the third cylindrical outer surface 288 on the first retainer member 260. The annular outer surface 322 is spaced axially from the first retainer member 260, and lies in a plane perpendicular to the axis 248. The annular outer surface 322 also extends radially outward from the body wall 250 of the initiator casing 246 to the cylindrical outer surface 320. The plastic material of the second retainer member 262 extends throughout the space between the first retainer member 260, the initiator 240, and the outer surfaces 320 and 322 of the second retainer member 262. The plastic material of the second retainer member 262 thus extends fully around the flange 256, fully throughout the groove 304, and fully throughout the compartment 314. Accordingly, the plastic material of the second retainer member 262 establishes a tight mechanical interlock which secures the initiator 240, the first retainer member 260, and the second retainer member 262 together as relatively immovable parts of the initiator unit 244. If the second retainer member 260 is formed of a plastic material, as shown in the drawings, it is preferably formed in place between the initiator 240 and the first retainer member 260 in an injection molding process. Such a process can be performed as known in the art.

Figure 9:
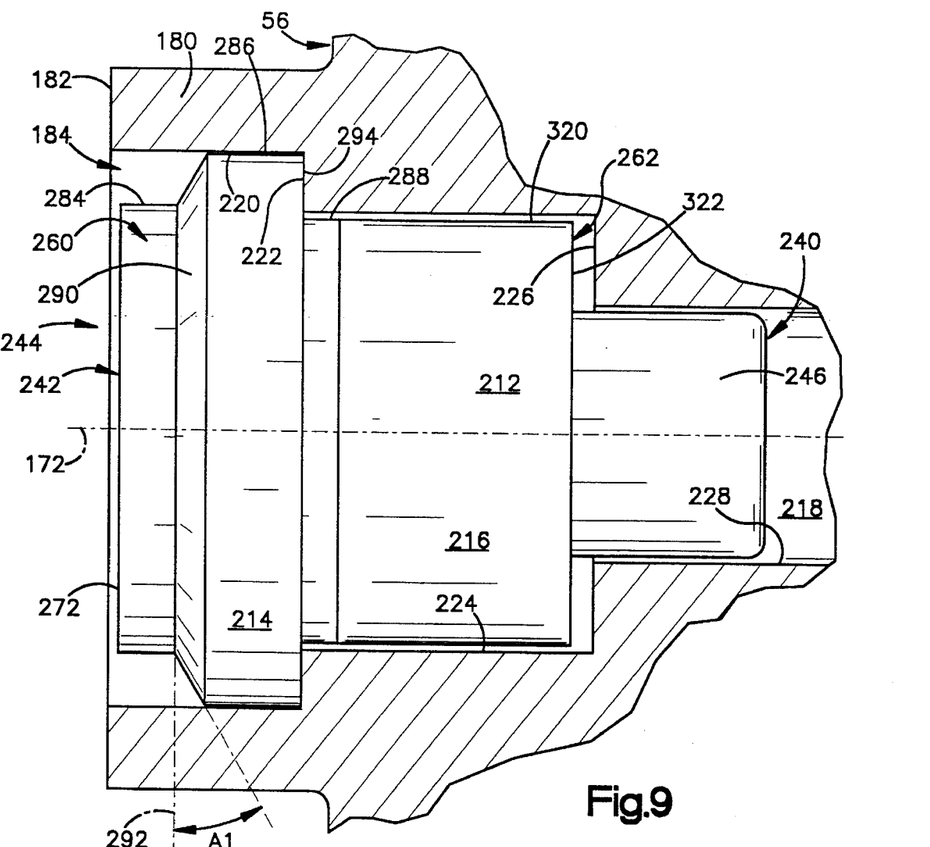
FIG. 9 is a partial view showing the parts of FIGS. 7 and 8 in an assembled relationship.

When the inflator 14 (FIG. 3) is being assembled, the initiator unit 244 is first placed coaxially within the passage 212 in the closure cap 56, as shown in FIG. 9. The initiator casing 246 then extends into the third section 218 of the passage 212, while the second retainer member 262 is received in the second section 216 of the passage 212. The annular outer surface 294 on the first retainer member 260 abuts the first annular inner surface 222 on the closure cap 56. The first cylindrical inner surface 220 on the closure cap 56 extends closely over the second cylindrical outer surface 286 on the first retainer member 260. The first cylindrical inner surface 220 further extends over the adjacent outer surfaces 290 and 284 of the first retainer member 260, but is spaced a substantial distance radially outward from those surfaces.

Figure 10:
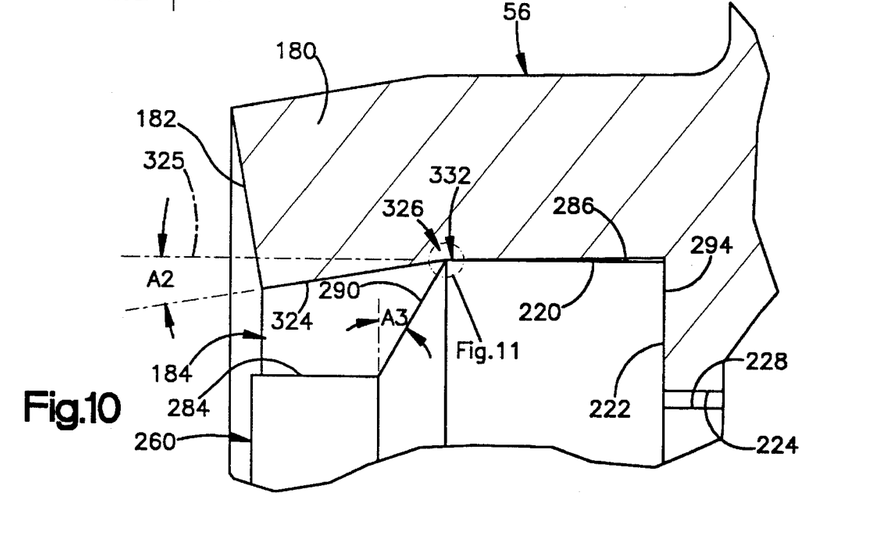
FIG. 10 is an enlarged partial view of parts shown in FIG. 9.

When the initiator unit 244 has been received in the closure cap 56, the surrounding first wall portion 180 of the closure cap 56 is crimped radially inward against the first retainer member 260, as shown in FIG. 10. The first cylindrical inner surface 220 is then deformed so as to have an axially outer portion 324 which extends radially inward from the second cylindrical outer surface 286 of the first retainer member 260. Specifically, the surface portion 324 extends radially inward at an angle A2 which is measured from a line 325 parallel to the axis 172. In this arrangement, the surface portion 324 blocks removal of the initiator unit 244 from the passage 212 in the closure cap 56. The initiator unit 244 is thus interlocked tightly with the closure cap 56.

Figure 11:
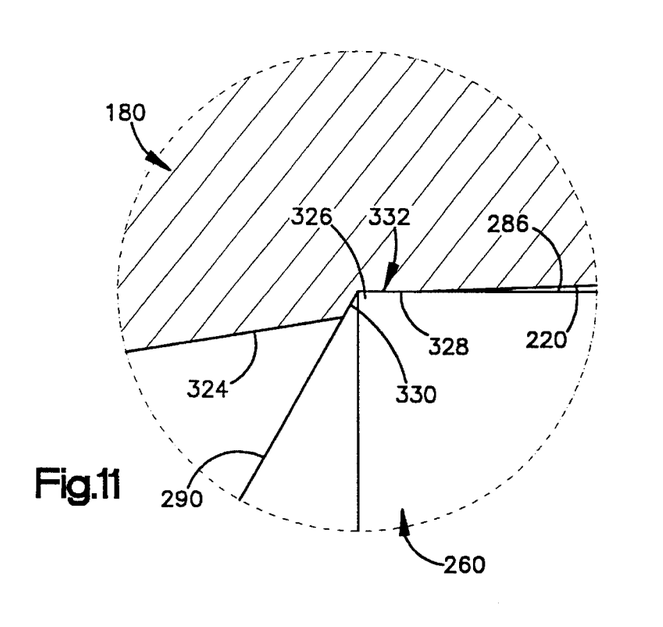
FIG. 11 is an enlarged partial view of parts shown in FIG. 10.

As further shown in FIG. 10, the wall portion 180 is pressed radially inward against a rim portion 326 of the first retainer member 260 which is defined at the juncture of the second cylindrical outer surface 286 and the frusto-conical outer surface 290. As shown in enlarged detail in FIG. 11, the wall portion 180 is deformed against the rim 26 such that the cylindrical inner surface 220 adopts the radial profile of the rim 326 where it adjoins the rim 326. The cylindrical inner surface 320 is thus provided with a pair of narrow portions 328 and 330 which adjoin the outer surfaces 286 and 290, respectively, at the rim 326. Moreover, the cylindrical inner surface 220 diverges radially from the outer surfaces 286 and 290 on axially opposite sides of the rim 326. The surfaces 328, 330, 286, and 290 that adjoin each other at the rim 326 thus provide a narrow annular seal 332 which extends circumferentially entirely around the axis 172 (FIG. 9) between the crimped wall portion 180 and the first retainer member 260. The seal 332 blocks a flow of gas that might otherwise escape from the combustion chamber 64 (FIG. 3) between the closure cap 56 and the initiator unit 244.

The effectiveness of the seal 332 is related to the angle A1. As described above with reference to FIG. 8, the frusto-conical outer surface 290 on the first retainer member 260 is inclined from the plane 292 at the angle A1, and the angle A1 is preferably equal to 30°. If the angle A1 were less than 30° the narrow inner surface portion 330 (FIG. 11) adjoining the frusto-conical surface 290 would be narrower. If the angle A1 were less than approximately 20°, the surface portion 330 would be too narrow to provide enough sealing surface area to establish an effective seal. On the other hand, if the angle A1 were greater than 30°, the surface portion 330 would be wider. If the angle A1 were greater than approximately 40° the sealing surface area provided by the surface portion 330 would be too large to provide an effective seal. This is because the force with which the adjoining surfaces 330 and 290 are pressed against each other would be distributed over an area so large that the contact pressure between the adjoining surfaces 330 and 290 would be too low to block a flow of the gas. Accordingly, maintaining the angle A1 within the foregoing range of values ensures that the adjoining metal surfaces are optimally pressed together to establish an effective seal 332.

Figure 12:
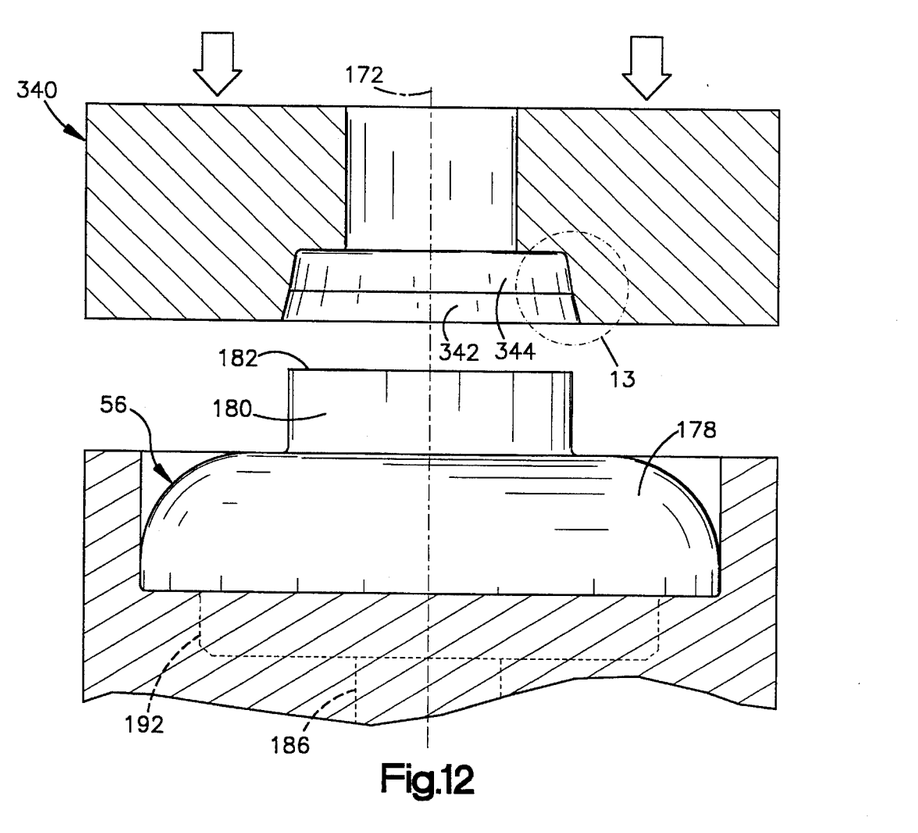
FIGS. 12 and 13 are schematic views of an apparatus used for assembling the inflator of FIG. 3.
Figure 13:
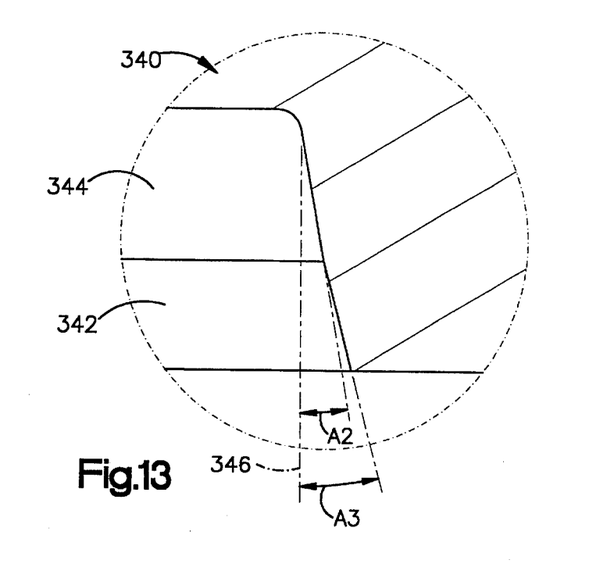

The process of crimping the wall portion 180 of the closure cap 56 can be performed in any suitable manner known in the art. However, as shown schematically in FIG. 12, such crimping is preferably performed by pressing a die 340 axially against the wall portion 180. The die 340 has a pair of concentric annular die surfaces 342 and 344. The first die surface 342 is inclined at an angle A3, which is preferably 15°, from a line 346 parallel to the axis 172. When the die 340 is moved axially against the wall portion 180 of the closure cap 56, the first die surface 342 guides the wall portion 180 into coaxial alignment with the second die surface 344. The second die surface 344 then bends the wall portion 180 at the angle A2, which is preferably 10°, upon further axial movement of the die 340 against the wall portion 180.

As further shown in FIG. 3, the outer wall 52 of the housing 50 has a major portion 350 and an open end portion 352. The major portion 350 of the outer wall 52 is cylindrical and extends axially over the tubular structure 62. The open end portion 352 of the outer wall 52 has an arcuate cross sectional profile extending radially inward, and axially outward, from the major portion 350. The open end portion 352 thus has the contour of a dome centered on the axis 40. The open end portion 352 further has an annular edge surface 354 which defines a circular opening 356 centered on the axis 40.

When the initiator unit 244 has been installed in the closure cap 56, as described above, the closure cap 56 is closely received coaxially within the outer wall 52 of the housing 50. Specifically, the open end portion 352 of the outer wall 52 closely overlies the peripheral surface 178 of the closure cap 56, and the annular edge surface 354 of the outer wall 52 encircles the first wall portion 180 of the closure cap 56. The first wall portion 180 thus projects axially outward through the opening 356.

As indicated in dot-dash lines in FIG. 3, the open end portion 352 of the outer wall 52 initially has the cylindrical shape of the major portion 350 of the outer wall 52. When the closure cap 56 has been moved coaxially into the housing 50, the open end portion 352 of the outer wall 52 is deformed radially and axially inward over the closure cap 56. This process provides the open end portion 352 of the outer wall 52 with a dome-shaped contour closely matching that of the peripheral surface 178 of the closure cap 56, and thus causes the open end portion 352 to overlie the peripheral surface 178 closely. Preferably, the open end portion 352 overlies the peripheral surface 178 in contact with a substantial area of the peripheral surface 178, and most preferably with an area that extends circumferentially entirely around the axis 40.

Figure 14:
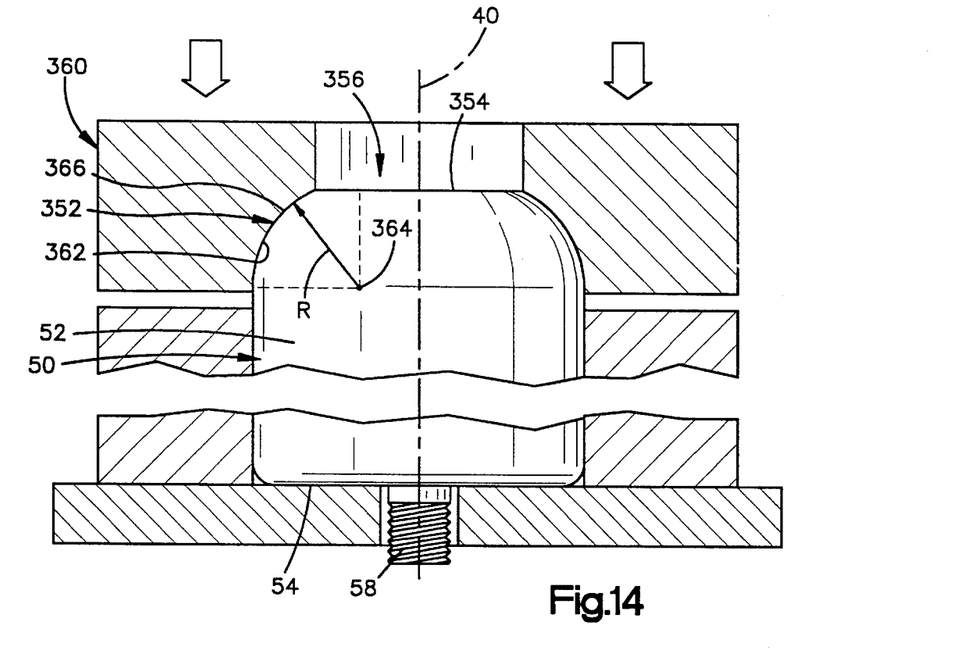
FIG. 14 is a schematic view of another apparatus used for assembling the inflator of FIG. 3.

As shown schematically in FIG. 14, the outer wall 52 of the housing 50 is preferably deformed by pressing a die 360 axially against the open end portion 352 of the outer wall 52. The die 360 has an arcuate inner surface portion 362 with a radial profile centered on a point 364. The radial profile of the inner surface portion 362 has a radius of curvature R, and extends approximately 65°–75° circumferentially about the center point 364. When the open end portion 352 of the outer wall 52 of the housing 50 is deformed in the die 360, the outer surface 366 of the open end portion 352 is provided with a radial profile matching that of the inner surface portion 362 of the die 360. The radial profile of the outer surface 366 then has the radius of curvature R, and extends approximately 65°–75° circumferentially about the center point 364. Accordingly, the arcuate extent of the dome-shaped contour of the open end portion 352 of the outer wall 52 is approximately 65°–75°. By maintaining that parameter of the open end portion 352 less than or equal to 90°, the housing 50 can be made of an impact extruded metal which has less ductility, such as aluminum, rather than steel. This is because the more brittle material is found not to fail structurally when bent into a dome-shaped configuration with an arcuate extent not greater than 90°, whereas it is more likely to crack or otherwise fail structurally if bent beyond that limit.

Figure 15:
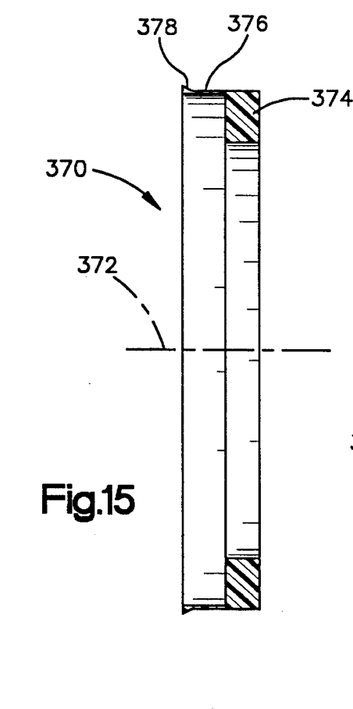
FIG. 15 is an enlarged sectional view of another part shown in FIG. 3.

An annular elastomeric seal 370 also is contained in the housing 50. As shown in FIG. 15, the seal 370 has a central axis 372, a body portion 374 with a rectangular cross section, and a lip portion 376 projecting axially from the body portion 374. The lip portion 376 of the seal 370 has a narrow radial thickness, as compared with the body portion 374, and includes a small flange 378 projecting radially outward at its free end.

The seal 370 is received in the housing 50 as shown in FIG. 3. The body portion 374 of the seal 370 is received coaxially over the third wall portion 192 of the closure cap 56, and extends radially outward to the outer wall 52 of the housing 50. The body portion 374 of the seal 370 further extends axially inward from the second inner side surface 200 of the closure cap 56 to the tubular part 62 of the inflator 14. The lip portion 376 of the seal 370 extends axially and radially between the dome-shaped peripheral surface 178 of the closure cap 56 and the dome-shaped end portion 352 of the outer wall 52. When the end portion 352 of the outer wall 52 is deformed radially and axially inward as described above, the body portion 374 and the lip portion 376 of the seal 370 are both compressively loaded between the surrounding surfaces of the adjoining parts of the inflator 14. As a result, the seal 370 fills the space through which gas might otherwise escape from the combustion chamber 64 and leak outward through the opening 356.

As described above, the open end portion 352 of the outer wall 52 of the housing 50 is deformed into a configuration having a dome-shaped contour closely matching the dome-shaped contour of the peripheral surface 178 of the closure cap 56. The curvature of the peripheral surface 178 is thus preferred to be the same as the curvature taken by the inner surface 380 of the open end portion 352 upon deformation of the open end portion 352. However, the curvatures of the peripheral surface 178 and the inner surface 380 may differ somewhat. This is acceptable because the seal 370 blocks the gas from leaking into any space that might extend between those surfaces as a result of a difference in their curvatures.

When the seal 370 is compressively loaded between the surrounding surfaces of the adjoining parts of the inflator 14 in the foregoing manner, a substantial force is transmitted axially from the closure cap 56 to the tubular structure 62 through the seal 370. The tubular structure 62 is thus pressed forcefully into the housing 50 along the axis 40 toward the end wall 54. As described above with reference to the spacer 130 and the seal 146, this causes the seal 146 to become compressively loaded between the surrounding surfaces of the adjoining parts of the inflator 14.

A coil spring 382 (shown schematically) is received closely within the third wall portion 192 of the closure cap 56, and extends axially from the first inner side surface 198 of the closure cap 56 to the first grain 110 of gas generating material adjacent to the closure cap 56. The coil spring 382 is compressed axially between the closure cap 56 and the first grain 110 of gas generating material, and thus presses the grains 110 of gas generating material together firmly enough to prevent them from rattling within the housing 50.

Figure 16:
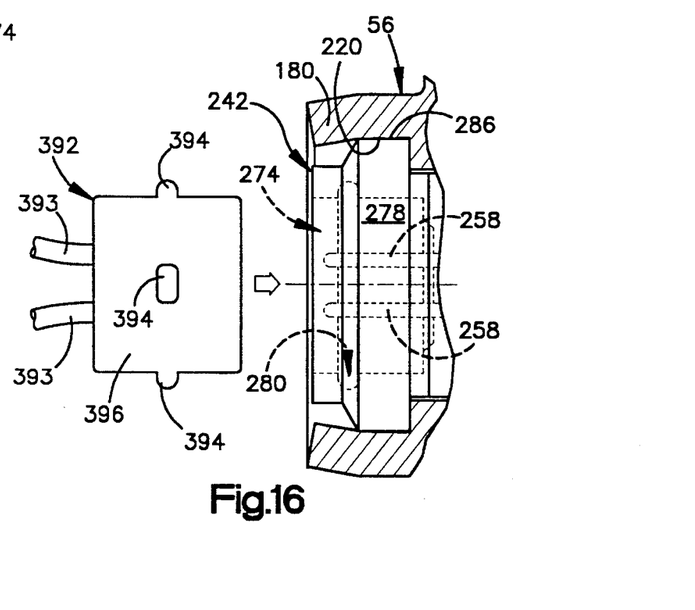
FIG. 16 is a view showing an assembled relationship of parts shown in FIGS. 1 and 9.

When the inflator 14 is installed in the reaction canister 16 as shown in FIGS. 1 and 2, the initiator 240 is included in an electrical circuit 390. As shown in FIG. 16, an electrical connector 392 is movable axially through the opening 274 in the first retainer member 260 and into the socket compartment 278 in the initiator unit 244. The connector 392 has a pair of electrical lead wires 393, and further has internal parts (not shown) of known construction for engaging the contact pins 258 so as to connect the initiator 240 in the electrical circuit 390. A plurality of feet 394 project radially from a cylindrical body portion 396 of the connector 392. The feet 394 snap into the groove 282 to lock the connector 392 in the socket compartment 278.

The electrical circuit 390 further includes a power source 398, which is preferably the vehicle battery and/or a capacitor, and a normally open switch 400. The switch 400 is preferably part of a collision sensor 402 which senses a vehicle condition indicative of a collision for which inflation of the air bag 12 is desired to restrain an occupant of the vehicle. The collision-indicating condition may comprise, for example, a predetermined amount of vehicle deceleration. The collision sensor 402 closes the switch 400 upon sensing such a collision-indicating condition.

When the switch 400 in the circuit 390 is closed, electric current passes through the initiator 240 between the contact pins 258. The pyrotechnic material in the initiator 240 is then ignited and, as described above, produces combustion products which rupture the casing 246. The combustion products are spewed from the casing 246 through the passage 212 to the closure member 238 at the inner end of the passage 212. The combustion products rupture the closure member 238 and are further spewed into the combustion chamber 64 through the opening 190. The combustion products then move against and ignite the first grain 110 of gas generating material in the combustion chamber 64 adjacent to the closure cap 56.

When the first grain 110 of gas generating material is ignited, it rapidly generates gas for inflating the air bag 12. It also produces and emits additional combustion products including heat and hot particles. Some of those combustion products move into contact with second grain 110. As a result, the second grain 110 also is ignited and, in turn, emits additional combustion products. This process continues along the length of the elongated body 60 of gas generating material as all of the grains 110 of gas generating material are ignited successively. The ignitable surface areas provided by the cylindrical inner surfaces 120, and the fluid communication provided by the passages 122, promote rapid ignition of the grains 110 in this manner. The elongated body 60 of gas generating material is thus ignited quickly along its entire length so that gas for inflating the air bag 12 is generated quickly along the entire length of the elongated body 60.

The gas generated upon combustion of the gas generating material flows radially outward from the combustion chamber 64 through the cylindrical screen 66. The gas is then cooled and filtered as it continues to flow radially outward through the layers 72–76 of the filter 70. The gas is at first confined within the housing 50 by the sheet 102 of rupturable pressure controlling material. When the pressure of the gas acting radially outward against the sheet 102 reaches a predetermined elevated level, it ruptures the circular portions 104 of the sheet 102 which extend across the inner ends of the gas outlet openings 100 in the outer wall 52. The gas then flows radially outward through the gas outlet openings 100.

As indicated schematically by the large arrows in FIG. 2, the gas flowing radially outward from the inflator 14 is directed toward the air bag 12 by the reaction canister 16. This flow of gas causes a reduction in the gas pressure inside the reaction canister 16 adjacent to the flaps 34 and 36. The reduction in the gas pressure inside the reaction canister 16 causes ambient air outside the reaction canister 16 to flow inward through the ambient air flow openings 28 and past the flaps 34 and 36, as indicated schematically by the small arrows in FIG. 2. The ambient air mixes with the gas in the reaction canister 16 and cools the gas. The ambient air also augments the flow of gas into the air bag 12, and thus reduces the amount of gas which must be generated by the gas generating material in the inflator 14. The air bag 12 is thus inflated into vehicle occupant compartment 18 to restrain an occupant of the vehicle.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a housing containing a source of fluid;

an actuatable initiator comprising means for initiating a flow of said fluid from said housing when said initiator is actuated;

a closure cap comprising means for closing an end portion of said housing, said closure cap having inner surface portions formed of a metal material; and a retainer comprising means for supporting said initiator on said closure cap, said retainer having outer surface portions formed of a metal material;

said inner surface portions of said closure cap and said outer surface portions of said retainer extending circumferentially around an axis and being pressed radially against each other so as to comprise sealing means for blocking said fluid from exiting said housing between said retainer and said closure cap;

said outer surface portions of said retainer including a cylindrical surface and a frusto-conical surface, said frusto-conical surface extending radially inward from said cylindrical surface and being inclined at an angle from a plane perpendicular to said axis, said angle being within the range of approximately 20° to approximately 40°.

2. Apparatus as defined in claim 1 wherein said angle is equal to approximately 30°.

3. Apparatus as defined in claim 1 wherein said retainer has a circumferentially extending rim defined by a juncture of said cylindrical surface and said frusto-conical surface, said inner surface portions of said closure cap being pressed radially inward against said rim so as to define an annular seal extending circumferentially around the circumference of said rim, said inner surface portions of said closure cap including a surface extending axially over, and diverging radially from, said frusto-conical surface of said retainer.

4. Apparatus as defined in claim 3 wherein said inner surface portions of said closure cap further include a surface extending axially over, and diverging radially from, said cylindrical surface of said retainer.

5. Apparatus as defined in claim 1 wherein said retainer has a metal portion and a non-metal portion, said metal portion including said outer surface portions, said non-metal portion having a configuration comprising means for interlocking said initiator with said metal portion separately from said closure cap.

6. Apparatus comprising:

a housing containing a source of fluid;

a metal closure cap comprising means for closing an end portion of said housing;

an initiator unit including an actuatable initiator, a metal retainer member, and a non-metal retainer member;

said initiator comprising means for initiating a flow of said fluid from said housing when said initiator is actuated;

said metal retainer member comprising means for supporting said initiator unit on said closure cap, said metal retainer member and said closure cap having metal surfaces which are pressed against each other so as to comprise sealing means for blocking said fluid from exiting said housing between said metal retainer member and said closure cap; and said non-metal retainer member having a configuration comprising means for interlocking said initiator with said metal retainer member separately from said closure cap.

7. Apparatus as defined in claim 6 wherein said metal surfaces include inner surfaces of said closure cap which extend circumferentially around an axis and which face radially inward, said metal surfaces further including outer surfaces of said metal retainer member which extend circumferentially around said axis and which face radially outward toward said inner surfaces of said closure cap, said inner and outer surfaces having adjoining portions which define a seal extending circumferentially around said axis, said inner and outer surfaces further having non-adjoining portions which diverge radially from each other on axially opposite sides of said seal.

8. Apparatus as defined in claim 7 wherein said outer surfaces of said metal retainer member include a cylindrical surface and a frusto-conical surface, said frusto-conical surface extending radially inward from said cylindrical surface and being inclined at an angle from a plane perpendicular to said axis, said angle being within the range of approximately 20° to approximately 40°.

9. Apparatus as defined in claim 6 wherein said metal surfaces include a surface on a wall portion of said closure cap which is crimped radially inward against said metal retainer member, said initiator having electrical contact means extending through said non-metal retainer member to said metal retainer member, said metal retainer member further comprising socket means for receiving an electrical connector in engagement with said electrical contact means, said socket means defining a socket compartment with an opening through which said electrical connector is movable into said socket compartment along said axis past said crimped wall portion of said closure cap.

* * * * *